US008307566B1

(12) United States Patent
Khan et al.

(10) Patent No.: US 8,307,566 B1
(45) Date of Patent: Nov. 13, 2012

(54) BLADE GAP SETTING FOR POTATO CHIP CUTTING HEAD

(75) Inventors: Ahmed Nadim Khan, Burton on Trent (GB); Richard Decena Ornelaz, Jr., Frisco, TX (US); Brian David Schroeder, Lancaster, TX (US); David Warren, Plano, TX (US); Julian Romanczukiewicz, Plano, TX (US)

(73) Assignee: Frito-Lay Trading Company GmbH, Bern (CH)

( * ) Notice: Subject to any disclaimer, the term of this patent is extended or adjusted under 35 U.S.C. 154(b) by 0 days.

(21) Appl. No.: 13/097,278

(22) Filed: Apr. 29, 2011

(51) Int. Cl.
*B23Q 17/22* (2006.01)

(52) U.S. Cl. ........................................................ 33/641

(58) Field of Classification Search ..................... 33/641
See application file for complete search history.

(56) References Cited

U.S. PATENT DOCUMENTS 1,946,193 A * 2/1934 Curdie ............................ 82/173
5,010,805 A * 4/1991 Ferrara ........................... 99/353

OTHER PUBLICATIONS

Figure 1 schematically illustrates a known blade gap setting device. Available in commerce for many years from Urschel Laboratories Inc. of Valpariaso, Indiana.

Figure 2 a side view showing the known blade gap setting device of Figure 1 when used to measure a blade gap of a potato chip cutter head.

* cited by examiner

*Primary Examiner* — Yaritza Guadalupe-McCall

(74) *Attorney, Agent, or Firm* — James R. Gourley; Shaukat A. Karjeker; Carstens & Cahoon, LLP

(57) ABSTRACT

A blade gap setting device for a potato chip cutting head, the device comprising an elongate body having an upper surface and a lower surface, at least one mounting for a depth micrometer having a displaceable spindle, the mounting extending from the upper surface to the lower surface to permit a depth micrometer to be mounted to the upper surface with a free end of the displaceable spindle being exposed at the lower surface, a first lower reference surface and a second front reference surface, at least the second front reference surface being located forwardly of the at least one mounting.

25 Claims, 4 Drawing Sheets

BLADE GAP SETTING FOR POTATO CHIP CUTTING HEAD

BACKGROUND TO THE INVENTION

The present invention relates to a blade gap setting device for a potato chip cutting head and to a method of setting the blade gap on a potato chip cutting head.

DESCRIPTION OF THE PRIOR ART

It is well known to employ a rotary cutting apparatus for cutting potatoes into fine slices for the manufacture of potato chips. A well-known cutting apparatus, which has been used for more than 50 years, comprises an annular-shaped cutting head and a central impeller assembly coaxially mounted for rotation within the cutting head to deliver food products, such as potatoes, radially outwardly toward the cutting head. A series of knives is mounted annularly around the cutting head and the knife cutting edges extend substantially circumferentially but slightly radially inwardly towards the impeller assembly. The knife blade is clamped to the cutting head to provide a gap, extending in a radial direction, between the cutting edge of the blade and the head. The gap defines the thickness of the potato slices formed by the cutter. As is known in the art, the blade gap can be measured and precisely adjusted in order to control the slice thickness. The adjustment is achieved by individual adjustment screws which move the individual blades radially with respect to one another. The blade gap must be very accurately set because the accuracy of the blade gap to the desired width impacts nearly every aspect of product quality and process efficiency for the manufacture of potato chips.

FIG. 1 schematically illustrates a known blade gap setting device. Such a device has been available in commerce for many years from Urschel Laboratories Inc. of Valparaiso, Ind., USA. FIG. 2 is a side view showing the known blade gap setting device of FIG. 1 when used to measure a blade gap of a potato chip cutter head The known blade gap setting device 100 includes a body 102 having mounted thereon a pair of longitudinally spaced depth micrometers 104 in the form of analogue dial indicators. Each depth micrometer 104 includes a longitudinally movable measurement spindle 106 located forwardly of the body 102. The body 102 includes a lower reference surface 108 which is adapted to bear against a wall 110 of the potato chip cutter head 112. The wall 110 is known in the art as a shoe, and is spaced rearwardly of the cutting edge 114 of the elongate blade 116. A sand gate 113 is fitted to the shoe 110 and is directly rearward of the cutting edge 114. The sand gate 113 may, or may not, comprise a plurality of circumferential channels separated by circumferential ribs. The body 102 also includes a pair of longitudinally spaced side reference surfaces 118 which are adapted to bear against the blade cutting edge 114 and to rest on the upper surface 115 of the sand gate 113. These lower and side reference surfaces 108, 118 locate the device 100 both radially and circumferentially with respect to the potato chip cutter head 112.

Each depth micrometer 104 can be adjusted so as to lower the free end 120 of the spindle 106 into contact with the inner surface 122 of the blade 116 to provide a measurement of the blade gap G in a radial direction between the blade cutting edge 114 and the adjacent sand gate 113. The gap is typically from 1 to 1.5 mm.

Such a known gap setting device suffers from a number of problems.

First, the device requires reference surfaces to bear against the cutting edge of the blade, which can tend to dull the sharpness of the blade edge.

Second, the device needs to be held in place manually by the operator during the measurement process so as to locate the reference points on the cutter assembly. This leads to poor ergonomics because it is difficult for the operator to maintain the device in the require location while reading the measured blade gap and adjusting the clamping of the blade to achieve the desired blade gap. In addition, the manual holding of the device introduces health and safety issues due to the potential for inadvertent operator contact with the adjacent blade cutting edge in the series of annularly located blades when locating and holding the device in position.

Third, the combined unit incorporating the specified reference surfaces and the analogue dial indicators can provide rather inaccurate blade gap readings.

Fourth, the device can be difficult to calibrate accurately and consistently in repeated calibrations, particularly carried out by different operators.

SUMMARY OF THE INVENTION

The present invention aims at least partially to overcome at least some of these problems of the known blade gap setting device.

Accordingly, the present invention provides a blade gap setting device for a potato chip cutting head, the device comprising an elongate body having an upper surface and a lower surface, at least one mounting for a depth micrometer having a displaceable spindle, the mounting extending from the upper surface to the lower surface to permit a depth micrometer to be mounted to the upper surface with a free end of the displaceable spindle being exposed at the lower surface, a first lower reference surface and a second front reference surface, at least the second front reference surface being located forwardly of the at least one mounting.

Optionally, in any embodiment of the present invention the blade gap setting device comprises two mountings, the two mountings being longitudinally spaced along the length of the elongate body, each mounting being adapted to mount a respective depth micrometer.

Optionally, in any embodiment of the present invention the first and second reference surfaces extend longitudinally. Optionally, in any embodiment of the present invention the first lower reference surface includes at least two portions which extend downwardly from the body by different distances. Optionally, in any embodiment of the present invention the blade gap setting device comprises two first lower reference surfaces, the two first lower reference surfaces extending longitudinally and being laterally spaced in a direction across the width of the elongate body.

Optionally, in any embodiment of the present invention the blade gap setting device further comprises at least one magnet connected to the body, and further optionally the at least one magnet is located towards the lower face. Further optionally, the at least one magnet is sandwiched between two elements, each element defining a respective first lower reference surface. Further optionally, the at least one magnet is supported in a holder.

Optionally, in any embodiment of the present invention the blade gap setting device further comprises a pair of inclined legs extending downwardly and forwardly from the body, the legs being longitudinally spaced along the elongate body. Optionally, the two legs have different thickness.

Optionally, in any embodiment of the present invention the blade gap setting device further comprises a handle extending upwardly and rearwardly from the body. Optionally, the handle is centrally located along the longitudinal direction of the elongate body.

Optionally, in any embodiment of the present invention the blade gap setting device further comprises at least one depth micrometer having a displaceable spindle, each depth micrometer being fitted into a respective mounting. Optionally, the depth micrometer is removably fitted into the respective mounting, and the device further comprises a clamping unit removably clamping each depth micrometer in the mounting, the clamping unit being adapted to permit selective rotation of the depth micrometer in the mounting.

Optionally, in any embodiment of the present invention the blade gap setting device further comprises a third lower reference surface on the lower surface, the third lower reference surface being located rearwardly of the at least one mounting. Optionally, the first lower reference surface extends downwardly from the body a greater distance than the third lower reference surface. Optionally, in this embodiment the device comprises two first lower reference surfaces, the two first lower reference surfaces being longitudinally spaced along the length of the elongate body. Optionally, in this embodiment the device comprises a single third lower reference surface, the third lower reference surface being centrally longitudinally spaced along the length of the elongate body.

The present invention further provides a blade gap setting device for a potato chip cutting head, the device comprising an elongate body having an upper surface and a lower surface, at least one mounting for a depth micrometer having a displaceable spindle, the mounting extending from the upper surface to the lower surface to permit a depth micrometer to be mounted to the upper surface with a free end of the displaceable spindle being exposed at the lower surface, at least one lower reference surface and at least one side reference surface adapted to fit the device in a desired radial and circumferential position to a potato chip cutting head, and at least one magnet connected to the body adapted to hold the device onto a potato chip cutting head by a magnetic force.

Optionally, the at least one magnet is located towards the lower face. Further optionally, the at least one magnet is sandwiched between two elements, each element defining a respective lower reference surface. Further optionally, the at least one magnet is supported in a holder.

Optionally, the blade gap setting device is in combination with a calibration block for the device, the calibration block comprising an upper surface of magnetic material adapted to hold the device thereon by a magnetic force from the at least one magnet, the upper surface having at least one channel shaped and dimensioned to receive the at least one lower reference surface and at least one side reference surface, the channel being adapted to fit the device in a desired vertical and horizontal position on the calibration block.

The present invention further provides a blade gap setting device for a potato chip cutting head, the device comprising an elongate body having an upper surface and a lower surface, at least one mounting for a depth micrometer having a displaceable spindle, the mounting extending from the upper surface to the lower surface to permit a depth micrometer to be mounted to the upper surface with a free end of the displaceable spindle being exposed at the lower surface, at least one lower reference surface and at least one side reference surface adapted to fit the device in a desired radial and circumferential position to a potato chip cutting head, and at least one downwardly extending inclined orientation element extending below the lower surface and adapted to fit within a potato chip cutting head at a predetermined orientation.

Optionally, the orientation element comprises an inclined leg extending downwardly and forwardly from the body. Further optionally, the blade gap setting device comprises a pair of inclined legs extending downwardly and forwardly from the body, the legs being longitudinally spaced along the elongate body. Optionally, the two legs have different thickness.

Optionally, the blade gap setting device further comprises a handle extending upwardly and rearwardly from the body. Optionally, the handle is centrally located along the longitudinal direction of the elongate body.

The present invention further provides a method of measuring a blade gap setting of a potato chip cutting head, the method comprising the steps of:

a. providing a blade cutter assembly of a potato chip cutting head including a first wall element carrying a blade mount which removably and adjustably mounts an elongate blade element having an exposed cutting edge and a second wall element spaced from the exposed cutting edge, a blade gap being defined between the cutting edge and an adjacent surface of the second wall element;
b. providing a blade gap setting device including a body mounting at least one depth micrometer thereon, the depth micrometer including a movable spindle, the body having a first lower reference surface and a second front reference surface;
c. fitting the blade gap setting device to the blade cutter assembly by respectively locating the first lower and second front reference surfaces to inner and side surfaces of the second wall element; and
d. moving a free end of the spindle into contact with the cutting edge to provide a distance measurement on the respective depth micrometer.

Optionally, the body includes a magnet and the blade gap setting device is magnetically secured to the blade cutter assembly in fitting step c.

Optionally, the blade gap setting device further comprises a pair of inclined legs extending downwardly and forwardly from the body, the legs being longitudinally spaced along the body, and in fitting step c the legs are slid through a spacing between the first and second wall elements.

Optionally, the blade gap setting device is rotated into position in fitting step c by a surface of the body rotating against a surface of the second wall element acting as a fulcrum.

The present invention further provides a method of calibrating a blade gap setting device of a potato chip cutting head, the method comprising the steps of:

a. providing a blade gap setting device including a body mounting at least one depth micrometer thereon, the depth micrometer including a movable spindle, the body having a first lower reference surface and a second front reference surface, the device further including at least one magnet;
b. providing a calibration block comprising an upper surface of magnetic material adapted to hold the device thereon by a magnetic force from the at least one magnet, the upper surface having at least one channel;
c. fitting the blade gap setting device to the upper surface of the calibration block by respectively locating the first lower and second front reference surfaces to lower and side surfaces of the channel, the channel being shaped and dimensioned to receive the at least one lower reference surface and at least one side reference surface and being adapted to fit the device in a desired vertical and horizontal position on the calibration block, in the fitted position the device being held in the desired position by the magnetic force from the at least one magnet; and d. moving a free end of the spindle into contact with the upper surface of the calibration block to provide a calibration of a distance measurement on the depth micrometer.

BRIEF DESCRIPTION OF THE DRAWINGS

Embodiments of the present invention will now be described, by way of example only, with reference to the accompanying drawings, in which.

DETAILED DESCRIPTION OF THE PREFERRED EMBODIMENTS

Figure 1:
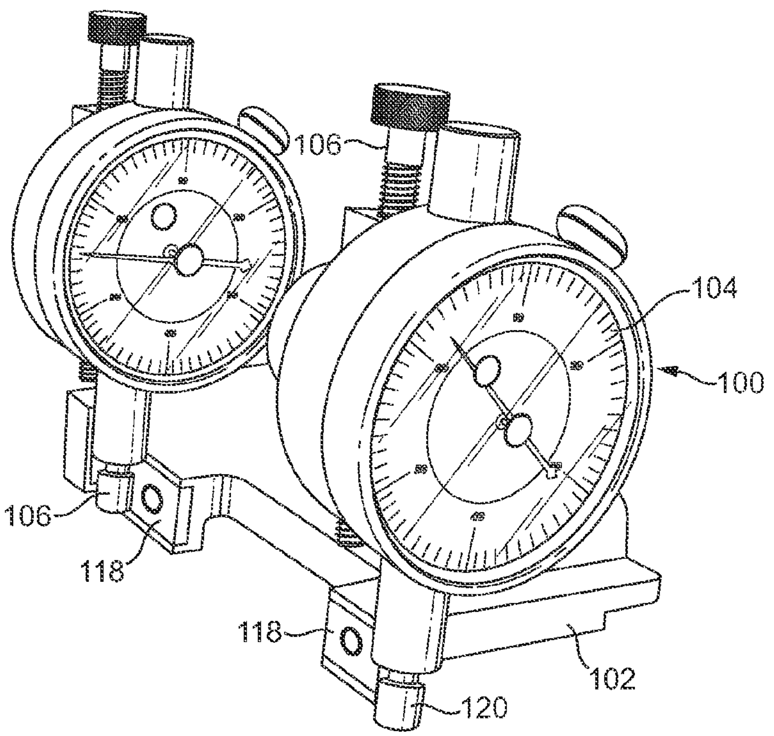
FIG. 1 PRIOR ART
FIG. 1 is a perspective view of a known blade gap setting device.
Figure 2:
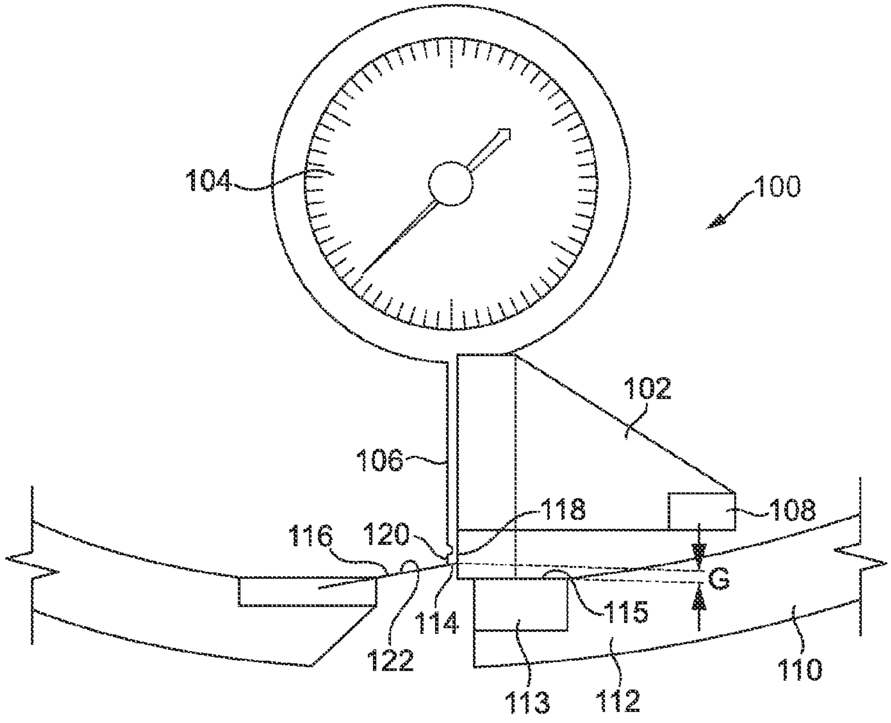
FIG. 2 PRIOR ART
FIG. 2 is a side view showing the known blade gap setting device of FIG. 1 when used to measure a blade gap of a potato chip cutter head.
Figure 3:
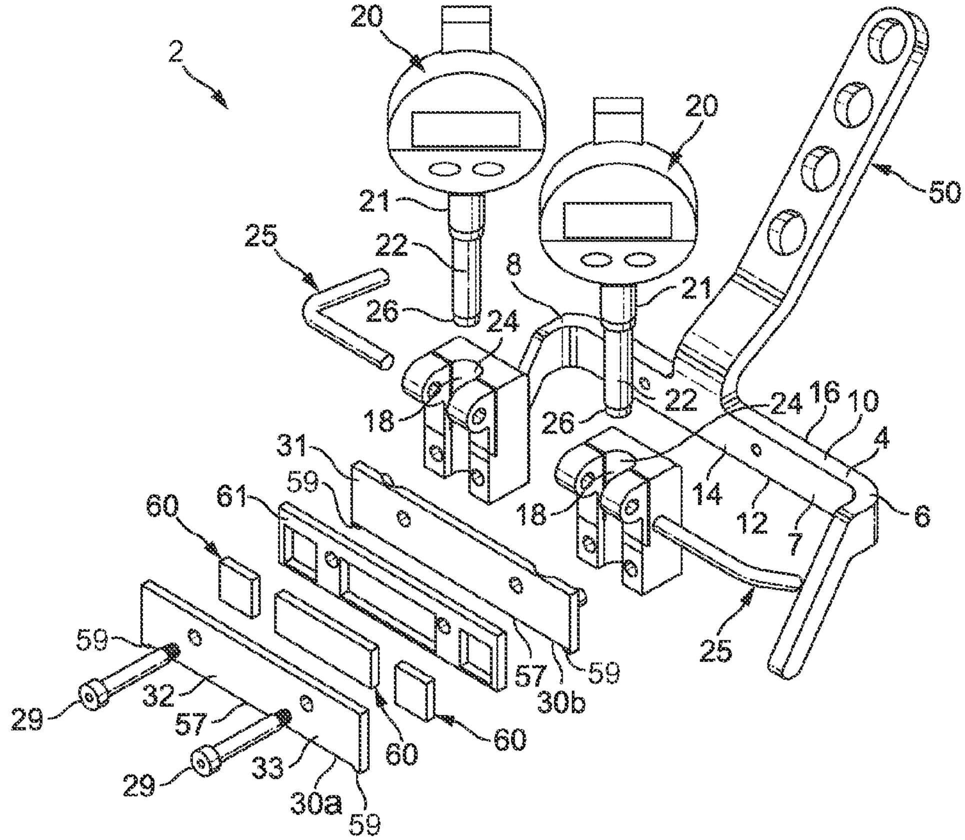
FIG. 3 is an exploded perspective view of a blade gap setting device in accordance with an embodiment of the present invention.
Figure 4:
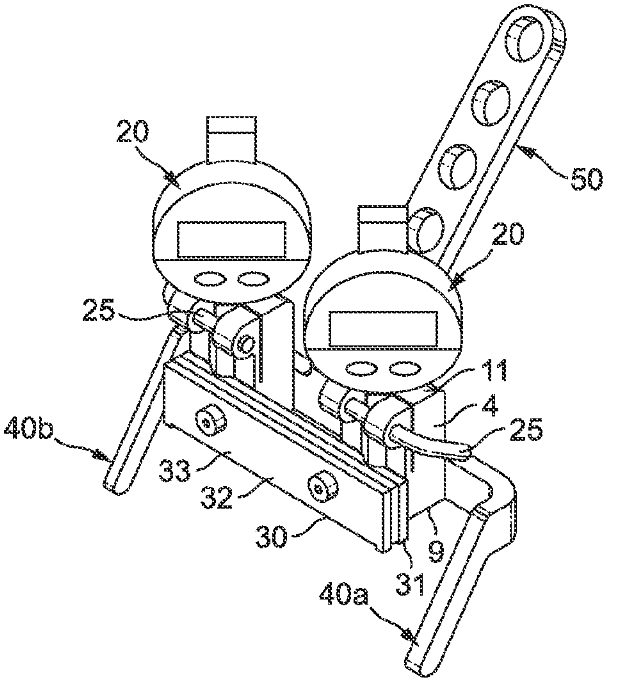
FIG. 4 is a perspective view of the assembled blade gap setting device of FIG. 3.

Referring to FIGS. 3 to 5, a blade gap setting device, designated generally as 2, in accordance with an embodiment of the present invention is illustrated. The device 2 includes a longitudinally extending elongate body 4 which is rigid. The body 4 is typically composed of a metal such as stainless steel. The longitudinal body 4 extends between first and second opposed ends 6, 8. The body 4 includes a support portion 7 which has an upper face 10, a lower face 12, a front side 14 and a rear side 16. Located inwardly of a respective end 6, 8 and fitted to the front side 14 are a pair of mountings 18 of the body 4, each mounting 18 adapted to mount a respective depth micrometer 20 having a displaceable spindle 22. The mounting 18 includes a hole 24, or channel as illustrated, extending downwardly there through to permit the depth micrometer 20 to be removably inserted into the hole 24. This mounts the depth micrometer 20 to the body 4 with a free end 26 of the displaceable spindle 22 being exposed at a lower surface 9 of the device 2. The hole 24 extends through the thickness of the body 4 between an upper surface 11 and the lower surface 9. The holes 24 are longitudinally separated along the length of the elongate body 4 so that each hole 24 is located inwardly of a respective end 6, 8 of the body 4.

Each depth micrometer 20 includes an annular shaft 21 containing the movable spindle 22. The shaft 21 is clamped within the hole 24 using a rotatable clamping element 25, which may include a cantilevered flexure providing an interference fit to provide sufficient friction to hold the depth micrometer 20 in the respective hole 24. The clamp can be released to allow the angular position of the depth micrometer 20 to be rotated to a desired rotational position.

The depth micrometer 20 is preferably a commercially available depth micrometer with a digital display readout providing an absolute measurement of the distance of the blade gap.

In a modified embodiment, the body 4 is provided with only one mounting 18 for a single depth micrometer 20. In a yet further modified embodiment, the body 4 is provided with greater than two mountings 18 for mounting greater than two depth micrometers 20.

A pair of lower reference surfaces 30*a*, 30*b* are provided on the lower surface 9, the two lower reference surfaces 30*a*, 30*b* being laterally spaced across the width of the elongate body 4. The lower reference surfaces 30*a, b* are fixed by bolts 29 to, and located forwardly of, the pair of mountings 18. The reference surfaces 30*a, b* extend longitudinally between and beyond the two mountings 18. The lower reference surfaces 30*a, b* are located downwardly from the body 4. The reference surfaces 30*a, b* may be integral with the body 4 or alternatively, as illustrated, defined in respective parallel longitudinal blocks 31, 32 fitted to the body 4.

A front reference surface 33 is located forwardly of the mountings 18. The front reference surface 33 is comprised of the front surface of block 32. The front reference surface 33 is employed to fit against a side surface of the sand gate, or of a shoe holding the sand gate, in order to fit the device in a desired circumferential position to a potato chip cutting head. The lower reference surfaces 30*a, b* are employed to fit against an upper surface of the sand gate, in order to fit the device in a desired radial position to a potato chip cutting head.

Each reference surface 30*a, b* comprises a central higher portion 57 between two opposed lower portions 59. These different height portions 57, 59 enable the reference surfaces 30*a, b* to engage with different cutter heads or with different respective sand gate constructions, used for manufacturing different types of potato chip using the same cutter head incorporating different blade/sand gate combinations.

A pair of inclined legs 40*a*, 40*b* extends downwardly and forwardly of the body 4. The legs 40*a*, 40*b* are longitudinally spaced along the elongate body 4, each being located at a respective end 6, 8. One leg 40*a* is of different thickness than the other leg 40*b*. The legs 40*a*, 40*b* have different thickness in order to achieve the desired longitudinal distance between reference surface 40*a* and the free end 26 of the spindles 22 as well as reference surface 40*b* and the free end 26 of the spindles 22 in order to align the opposed free ends 26 properly on shaped blades.

A handle 50 is integral with or mounted to the body 4. The handle is inclined rearwardly and upwardly away from the body 4, and therefore the legs 40 and handle 50 extend towards opposite sides of the body 4. The handle 50 is centrally located along the longitudinal direction of the elongate body 4.

At least one magnet 60 is connected to the body 4, and may be provided in or on the body 4. In the illustrated embodiment, the three linearly spaced magnets 60, extending serially along the length of the body 4, are held in a holder 61 which is sandwiched between the two blocks 31, 32. The magnets 60 are preferably located towards or at the lower surface 9 so that the lower surface 9 of the body 4 is magnetically attracted to a material such as stainless steel from which a blade cutter assembly of a potato chip cutting head is typically composed. The magnets 60 provide that the body 4 can be temporarily attached, by the magnetic force, to the internal circumferential surface of such a blade cutter assembly.

Figure 5A:
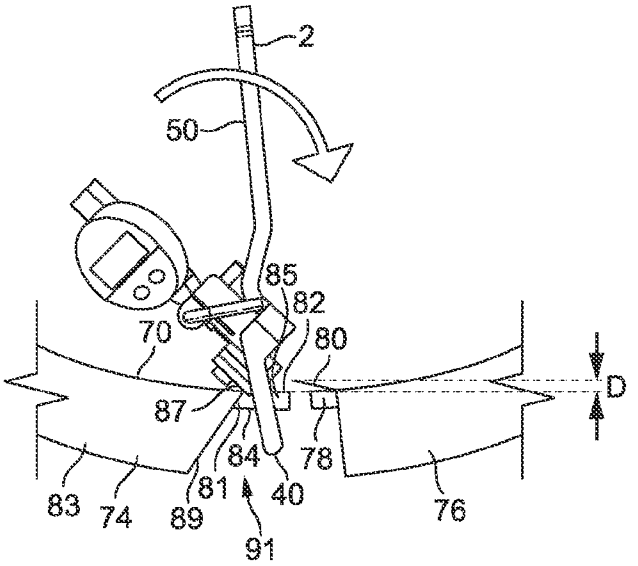
FIGS. 5*a* and 5*b* are side views which illustrate sequential steps during insertion of the blade gap setting device of FIG. 3 into a cutting head.
Figure 5B:
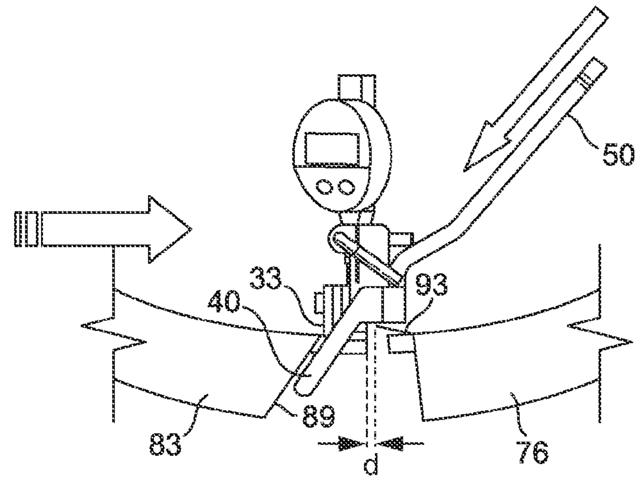

In use, as shown in FIGS. 5*a* and 5*b*, the blade gap setting device 2 is temporarily attached by the magnetic force of the magnets 60 to the internal circumferential surface 70 of a blade cutter assembly 74 of a potato chip cutting head. The blade cutter assembly 74 includes an arcuate first wall element 76, or shoe, carrying a blade mount 78 which removably and adjustably mounts an elongate blade element 80 having an exposed cutting edge 82 pointing substantially circumferentially but oriented radially inwardly, as is known in the potato chip cutter art. A sand gate 84, comprising a second wall element which may or may not have a plurality of circumferential channels separated by ribs (not shown), is spaced circumferentially from the exposed cutting edge 82 by a spacing 90 having a distance d. The sand gate 84 is supported on a second arcuate wall element 83, or shoe. The cutting edge 82 is radially inwardly located a desired blade gap distance D from the inner surface of the sand gate 84. This distance D can be varied by moving the elongate blade element 80 in the blade mount 78.

The blade gap setting device 2 is held manually by the handle 50 and moved within the central cavity of the blade cutter assembly 74 towards the internal circumferential surface 70. The legs 40*a*, 40*b* are longitudinally spaced along the elongate body 4 by a distance which is greater than the length of the blade element 80 to be measured, so that the legs 40 do not contact the blade element but slide into the spacing 91 between the wall element 76 and sand gate 84 at opposite ends of the blade element 80.

As shown in FIG. 5*a*, the device 2 is inserted with the legs 40 substantially downwardly and radially oriented. After insertion, the device 2 is rotated downwardly as shown by the arrow in FIG. 5*a* with the end wall 81 of the sand gate 84 acting as a fulcrum against which the front surface 87 of the body 4 is rotated. This action causes the operator to push the device 2, as shown by the arrow in FIG. 5*b*, downwardly and away from the blade element 80 so that the cutting edge 82 of the blade element 80 is not inadvertently damaged. The inclined legs 40 function to indicate the insertion orientation of the device and are shaped and dimensioned to cooperate complementarily with the shape and dimensions of the inclined end surface 89 of the shoe 83. This inclined leg configuration ensures that the operator inserts the device in the correct orientation.

The lower reference surfaces 30*a, b* are rotated downwardly so as to contact the inner surface 85 of the sand gate 84. This locates the device accurately in position over the blade cutter assembly 74 within the potato chip cutting head, as shown in FIG. 5*b*.

No part of the device has contacted the blade element 80 during the fitting operation. The rearmost part of the first reference surface 30 is spaced a small distance, for example about 0.5 mm, forwardly from the cutting edge, so as not inadvertently to damage the cutting edge. The device 2 is held in this fitted position by the magnetic attraction between the magnet 60 and the sand gate 84.

During the subsequent measuring operation, the free ends 26 of the spindles 22 are moved downwardly so as to the upper surface 93 of the blade element 80. The depth reading shown in the digital display of the depth micrometers 20 corresponds to the blade gap D. The depth micrometers 20 are preferably longitudinally spaced by a distance which substantially corresponds to the length of the blade element 80 to be measured, so that the free ends 26 of the spindles 22 contact the longitudinal ends of the upper surface of the blade element 80. This avoids any potential damage to the major central cutting portion of the blade element 80.

While the device is fitted in the desired location and held in a hands-free manner by the magnetic fitting, the position of the blade element 80 within the blade mount 78 can be adjusted.

Thereafter, the handle 50 can be manually engaged and pulled upwardly, disengaging the magnetic holding force. This rotates the device upwardly in a reverse direction away from the sand gate 84, with the end wall 81 of the sand gate 84 again acting as a fulcrum against which the front surface 87 of the body 4 is rotated. After the legs 40 are substantially radially oriented, the device 2 can be pulled clear. The device may then be used to measure and adjust the blade gap of the adjacent blade cutter assembly 74.

Figure 6:
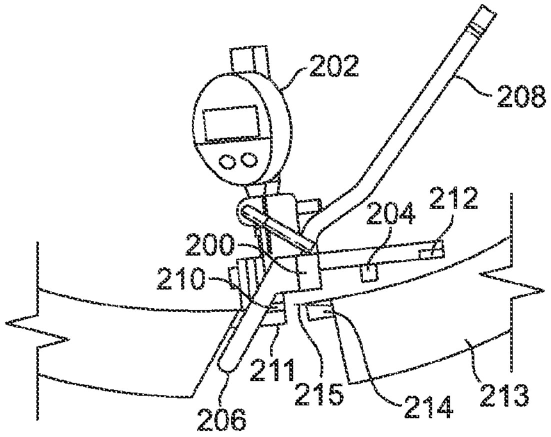
FIG. 6 is a schematic side view showing a blade gap setting device in accordance with a second embodiment of the present invention when used to measure a blade gap of a potato chip cutter head.

FIG. 6 shows an alternative construction for a blade gap setting device according to a second embodiment of the present invention. The structure is similar to that of the first embodiment, incorporating an elongate body 200 mounting depth micrometers 202, a magnet 204, inclined legs 206 and an inclined handle 208. However, in this embodiment the device includes at least one first reference surface 210 which is adapted to be disposed on the sand gate 211 after fitting for the measurement operation, similar to the reference surfaces 30 of the first embodiment, and a second reference surface 212 which is adapted to be disposed on the shoe 213 carrying the blade mount 214 after fitting for the measurement operation. The first and second reference surfaces 210, 212 are spaced apart so as to be located on opposite sides of the blade 215 after fitting for the measurement operation. The magnet 204 is mounted on the body 200 so as to be disposed above or against the shoe 213 carrying the blade mount 214 after fitting for the measurement operation. Again, the insertion operation is similar to that of the first embodiment, by rotating the device downwardly and urging the device away from the blade 215 and against the edge of the sand gate 210.

By providing that the blade gap setting device 2 may incorporate one or more magnets so as to be adapted to be magnetically held onto a magnetic material, in accordance with another aspect of the invention the device may benefit from improved calibration accuracy and repeatability.

Figure 7:
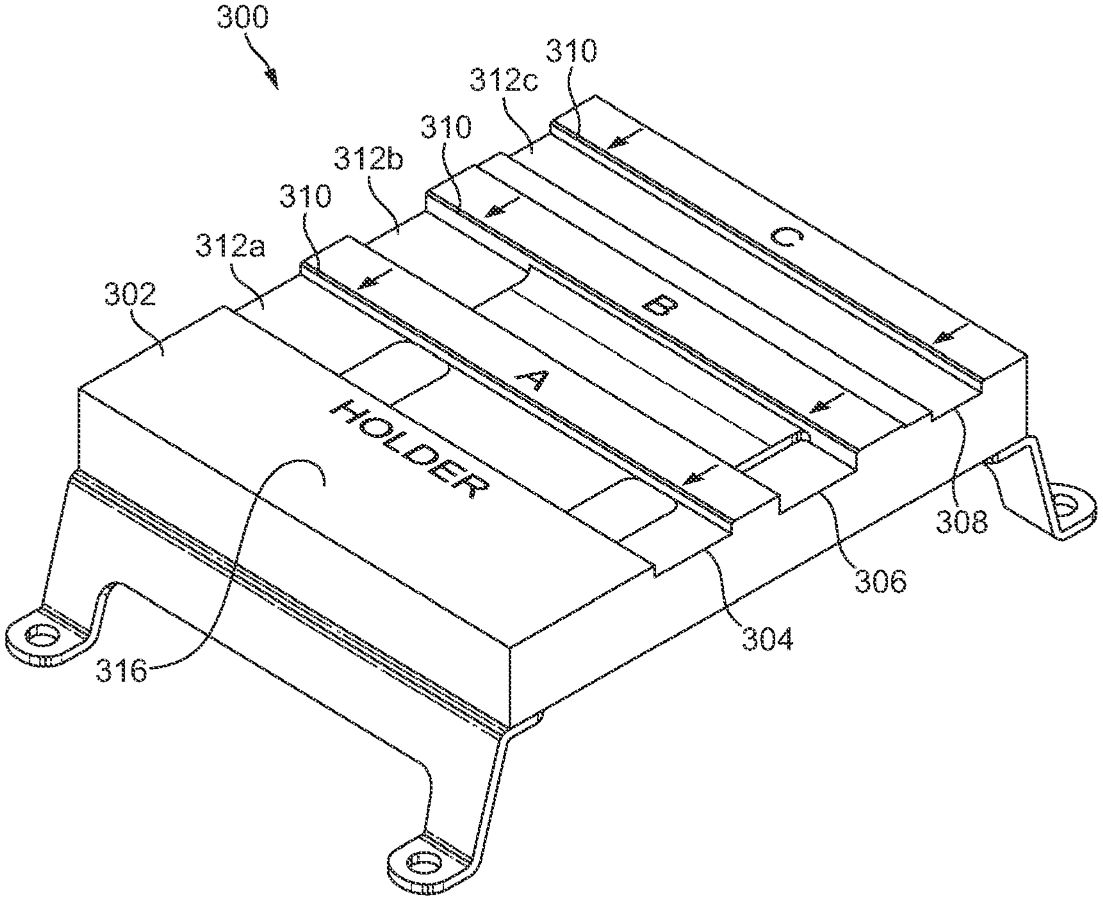
FIG. 7 is a perspective view of a calibration block for use with the blade gap setting device in accordance with another aspect of the present invention.

Referring to FIG. 7, the depth micrometer(s) 20, when mounted in the device 2, can readily be calibrated on a calibration block 300 which can also act as a holder for the device 2. The calibration block 300 may be made of a magnetic material to enable the calibration operation to be hands-free. The calibration block 300 may be composed of a hard stainless steel magnetic material, for example stainless steel 440C, which improves the dimensional stability and wear resistance of the calibration block 300.

The calibration block 300 has a generally planar upper surface 302 which includes at least one calibration channel. In the illustrated embodiment there are three parallel calibration channels 304, 306, 308. Each channel 304, 306, 308 corresponds to a cutter head set-up for manufacturing a particular potato chip product. The channels 304, 306, 308 therefore vary in channel depth and in the profile of the lower surface 312*a, b, c* of the channels 304, 306, 308. The upper surface 302 also has a planar holding zone 316 for resting the device 2 when not in use.

During the calibration process, the body 4 of the device 2 is fitted into the selected channel 304, 306, 308. The front reference surface 33 is urged against a reference edge 310 of the selected channel 304, 306, 308, indicated by arrows on the upper surface 302. This simulates the front reference surface 33 fitting against a side surface of the sand gate, or of a shoe holding the sand gate, in the corresponding potato chip cutting head. The lower reference surfaces 30*a, b* are received in the selected channel 304, 306, 308 and rest on the lower surface 312*a, b, c*, which simulates the device 2 resting on the sand gate. The selected channel 304, 306, 308 is therefore adapted to fit the device 2 in a desired vertical and horizontal position on the calibration block 300 simulating the corresponding position on the associated cutting head.

The spindle of the depth micrometer 20 can then be lowered into contact with the calibration block 300 and the readout adjusted to provide a zero reading. This means that when subsequently used to measure blade gap, the absolute measurement of the blade gap is indicated on the display of the depth micrometer 20.

The blade gap setting device according to the preferred embodiments of the present invention provides a number of advantages over the known blade gap setting device discussed hereinabove.

In particular, the blade gap setting device can provide a very accurately measurement of the blade gap setting, typically with a tolerance of +/−40 microns. The gap setting can be accurately measured along the length of the blade.

In addition, the blade gap setting device is very easy to install accurately in position on the potato chip cutting head. The magnet holds the device in the desired position on the potato chip cutting head, allowing the operator to use both hands to adjust the blade gap while the measuring device is still located securely in position in the potato chip cutting head. Therefore the blade gap setting device is configured as a "hands-free" device. The particular magnet design of the preferred embodiment allows for the use, to form the body, of hard stainless steel materials, for example stainless steel 440C, which improves the dimensional stability and wear resistance of the device.

The inclined handle improves the ergonomics of the device and provides easy maneuvering of the device into and out of the measurement position. The handle provides leverage to disengage the magnetic force holding the device onto the cutting head, with the front end of the body being rotatable against a fulcrum of the cutter head during the insertion and removal operation. The handle is oriented upwardly away from the body and points towards the rearward side of the device, which tends to move the hand of the operator upwardly away from any adjacent cutting blades of the series of cutting blades which are located annually around the potato chip cutting head.

In addition, the blade gap setting device of the preferred embodiments does not contact the cutting edge of the blade during use and so does not tend to dull the cutting edge during use, in contrast to the known setting device discussed above. The blade gap setting device of the preferred embodiments includes reference surfaces that only bear against and reference the interior circumferential wall and/or sand gate surfaces. The spindle of the depth micrometer only bears against the inner surface of the blade, which constitutes the top blade surface during the measurement operation. No part of the blade gap setting device applies a force, in particular a lateral or sideways force, onto the blade edge and therefore the blade is not dulled during the measuring operation. Furthermore, since the operator manually places the device in the opposite direction of the blade edge, the device exhibits improved health and safety benefits.

In the preferred embodiments, the reference surfaces are configured to be utilizable with a wide variety of different cutting head shapes and dimensions. Furthermore, since the reference surfaces of the blade gap setting device do not contact the blade cutting surface, the correct orientation of the blade gap setting device is independent of blade shape and configuration, and accordingly the same device can be used alternatively with linear planar blades, such as for manufacturing conventional potato chips, or non-planar profiled blades, such as for manufacturing crinkle cut or other three dimensionally-shaped potato chips.

In the preferred embodiments, the structure of the body of the blade gap setting device, in particular the structure of the inclined legs, provides that the device can be quickly and easily located in the correct position and orientation within the cutting head without damaging the depth micrometers or the blade. This provides that the device can readily be located in position without danger of damaging either the cutter head or the device itself.

The depth micrometers can readily be located into the correct angular position for reading the upper surface of the blade. By providing a design with the inclined legs, the device can be reliably rotated into a correct engaged position with the magnetic holding force holding the device in position.

The device of the preferred embodiments may be used for the blade gap measurement of cutter heads of the two ring or single ring type, with appropriate rotation of the depth micrometers so that the display is visible to the operator in the respective measurement orientation.

Other modifications to the blade gap setting device of the preferred embodiments of the present invention will be readily apparent to those skilled in the art.

What is claimed is:

1. A blade gap setting device for a potato chip cutting head, the device comprising an elongate body having an upper surface and a lower surface, at least one mounting for a depth micrometer having a displaceable spindle, the mounting extending from the upper surface to the lower surface to permit a depth micrometer to be mounted to the upper surface with a free end of the displaceable spindle being exposed at the lower surface, a first lower reference surface; a second front reference surface, at least the second front reference surface being located forwardly of the at least one mounting; and a pair of inclined legs extending downwardly and forwardly from the body, the legs being longitudinally spaced along the elongate body.

2. A blade gap setting device according to claim 1 comprising two mountings, the two mountings being longitudinally spaced along the length of the elongate body, each mounting being adapted to mount a respective depth micrometer.

3. A blade gap setting device according to claim 2 wherein the first and second reference surfaces extend longitudinally.

4. A blade gap setting device according to claim 1 wherein the first lower reference surface includes at least two portions which extend downwardly from the body by different distances.

5. A blade gap setting device according to claim 1 comprising two first lower reference surfaces, the two first lower reference surfaces extending longitudinally and being laterally spaced in a direction across the width of the elongate body.

6. A blade gap setting device according to claim 1 further comprising at least one magnet connected to the body.

7. A blade gap setting device according to claim 6 wherein the at least one magnet is located towards the lower face.

8. A blade gap setting device according to claim 6 wherein the at least one magnet is sandwiched between two elements, each element defining a respective first lower reference surface.

9. A blade gap setting device according to claim 8 wherein the at least one magnet is supported in a holder.

10. A blade gap setting device according to claim 1 wherein the two legs have different thickness.

11. A blade gap setting device according to claim 10 further comprising a handle extending upwardly and rearwardly from the body.

12. A blade gap setting device according to claim 11 wherein the handle is centrally located along the longitudinal direction of the elongate body.

13. A blade gap setting device according to claim 1 further comprising at least one depth micrometer having a displaceable spindle, each depth micrometer being fitted into a respective mounting.

14. A blade gap setting device according to claim 13 wherein the depth micrometer is removably fitted into the respective mounting, and the device further comprises a clamping unit removably clamping each depth micrometer in the mounting, the clamping unit being adapted to permit selective rotation of the depth micrometer in the mounting.

15. A blade gap setting device according to claim 1 further comprising a third lower reference surface on the lower surface, the third lower reference surface being located rearwardly of the at least one mounting.

16. A blade gap setting device according to claim 15 wherein the first lower reference surface extends downwardly from the body a greater distance than the third lower reference surface.

17. A blade gap setting device according to claim 15 comprising two first lower reference surfaces, the two first lower reference surfaces being longitudinally spaced along the length of the elongate body.

18. A blade gap setting device according to claim 17 comprising a single third lower reference surface, the third lower reference surface being centrally longitudinally spaced along the length of the elongate body.

19. A blade gap setting device for a potato chip cutting head, the device comprising an elongate body having an upper surface and a lower surface, at least one mounting for a depth micrometer having a displaceable spindle, the mounting extending from the upper surface to the lower surface to permit a depth micrometer to be mounted to the upper surface with a free end of the displaceable spindle being exposed at the lower surface, at least one lower reference surface and at least one side reference surface adapted to fit the device in a desired radial and circumferential position to a potato chip cutting head, and at least one magnet connected to the body adapted to hold the device onto a potato chip cutting head by a magnetic force.

20. A blade gap setting device according to claim 19 in combination with a calibration block for the device, the calibration block comprising an upper surface of magnetic material adapted to hold the device thereon by a magnetic force from the at least one magnet, the upper surface having at least one channel shaped and dimensioned to receive the at least one lower reference surface and at least one side reference surface, the channel being adapted to fit the device in a desired vertical and horizontal position on the calibration block.

21. A blade gap setting device for a potato chip cutting head, the device comprising an elongate body having an upper surface and a lower surface, at least one mounting for a depth micrometer having a displaceable spindle, the mounting extending from the upper surface to the lower surface to permit a depth micrometer to be mounted to the upper surface with a free end of the displaceable spindle being exposed at the lower surface, at least one lower reference surface and at least one side reference surface adapted to fit the device in a desired radial and circumferential position to a potato chip cutting head, and at least one downwardly extending inclined orientation element extending below the lower surface and adapted to fit within a potato chip cutting head at a predetermined orientation.

22. A method of measuring a blade gap setting of a potato chip cutting head, the method comprising the steps of:

a. providing a blade cutter assembly of a potato chip cutting head including a first wall element carrying a blade mount which removably and adjustably mounts an elongate blade element having an exposed cutting edge and a second wall element spaced from the exposed cutting edge, a blade gap being defined between the cutting edge and an adjacent surface of the second wall element;

b. providing a blade gap setting device including a body mounting at least one depth micrometer thereon, the depth micrometer including a movable spindle, the body having a first lower reference surface and a second front reference surface reference;

c. fitting the blade gap setting device to the blade cutter assembly by respectively locating the first lower and second front reference surfaces to inner and side surfaces of the second wall element, and by rotating a surface of the body against a surface of the second wall element acting as a fulcrum; and d. moving a free end of the spindle into contact with the cutting edge to provide a distance measurement on the respective depth micrometer.

23. A method according to claim 22 wherein the body includes a magnet and the blade gap setting device is magnetically secured to the blade cutter assembly in fitting step c.

24. A method according to claim 22 wherein the blade gap setting device further comprises a pair of inclined legs extending downwardly and forwardly from the body, the legs being longitudinally spaced along the body, and in fitting step c the legs are slid through a spacing between the first and second wall elements.

25. A method of calibrating a blade gap setting device of a potato chip cutting head, the method comprising the steps of:

e. providing a blade gap setting device including a body mounting at least one depth micrometer thereon, the depth micrometer including a movable spindle, the body having a first lower reference surface and a second front reference surface, the device further including at least one magnet;

f. providing a calibration block comprising an upper surface of magnetic material adapted to hold the device thereon by a magnetic force from the at least one magnet, the upper surface having at least one channel;

g. fitting the blade gap setting device to the upper surface of the calibration block by respectively locating the first lower and second front reference surfaces to lower and side surfaces of the channel, the channel being shaped and dimensioned to receive the at least one lower reference surface and at least one side reference surface and being adapted to fit the device in a desired vertical and horizontal position on the calibration block, in the fitted position the device being held in the desired position by the magnetic force from the at least one magnet; and h. moving a free end of the spindle into contact with the upper surface of the calibration block to provide a calibration of a distance measurement on the depth micrometer.

* * * * *